(12) United States Patent
Jayaram

(10) Patent No.: US 8,256,316 B2
(45) Date of Patent: Sep. 4, 2012

(54) LINEAR BEARING ASSEMBLY WITH SPHERICAL ROLLERS

(75) Inventor: Mavinkal Jayaram, Broadview Heights, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 407 days.

(21) Appl. No.: 12/705,294

(22) Filed: Feb. 12, 2010

(65) Prior Publication Data

US 2010/0206115 A1    Aug. 19, 2010

Related U.S. Application Data

(60) Provisional application No. 61/152,431, filed on Feb. 13, 2009.

(51) Int. Cl.
*F16H 1/24*        (2006.01)
*F16H 55/02*       (2006.01)

(52) U.S. Cl. .................................. 74/424.88; 74/424.82
(58) Field of Classification Search ............... 74/424.82, 74/424.88, 424.91, 25; 384/566, 627
See application file for complete search history.

(56) References Cited

U.S. PATENT DOCUMENTS

| | | | | | |
|---|---|---|---|---|---|
| 3,272,021 | A | * | 9/1966 | Weber | 74/25 |
| 3,903,748 | A | * | 9/1975 | Krogsrud | 74/25 |
| 4,246,802 | A | * | 1/1981 | Rasmussen et al. | 74/25 |
| 4,660,431 | A | * | 4/1987 | Heine | 74/89.42 |

* cited by examiner

*Primary Examiner* — Justin Krause
(74) *Attorney, Agent, or Firm* — Lucas & Mercanti, LLP; Klaus P. Stoffel

(57) ABSTRACT

A linear bearing employs spherical roller bodies which are contained in a roller nut body with two drive helixes and two return helixes which form a continuous loop in the nut body. The return helixes are offset from the drive helixes and have a pressure relief cutout to allow for movement of the spherical roller bodies through the return helix region.

14 Claims, 6 Drawing Sheets

LINEAR BEARING ASSEMBLY WITH SPHERICAL ROLLERS

FIELD OF THE INVENTION

The present Invention relates to linear bearing assemblies and, more particularly, to linear bearings which move on ground or smooth shafts.

BACKGROUND OF THE INVENTION

Currently, linear bearings use either ground (smooth) shafts or threaded shafts in conjunction with a roller nut that houses ball bearings. One of the problems with ball bearings is that the thrust load is dependent on the load capabilities of the ball bearing under a point load, the point of contact between the outer race of the ball bearing and the shaft. This limits the linear thrust capabilities of the linear bearing. In order to handle increased thrust, the nut assembly must be much larger than the diameter of the shaft which makes the device less practical.

OBJECTS OF THE INVENTION

An object of the present Invention is to obtain linear motion from rotary motion using conventional ground shafts by using a nut that requires minimal or no maintenance. Furthermore, it is an object of the present Invention to provide a high load capability for the rolling nut while maintaining a smaller size than conventional roller nuts.

These, and other objects of the present Invention, will be more readily understood by reference to the following description.

SUMMARY OF THE INVENTION

The objects of the present Invention are obtained by using a spherical roller body in conjunction with a roller nut body that has two drive helix regions and two return helix regions which are offset from one another. By offsetting the return helix regions from the drive helix regions, rotary motion can be transferred into linear motion and spherical roller bodies can be employed.

The roller nut assembly of the present Invention for a linear bearing on a ground shaft can be defined as comprising the following:
  a cylindrical ring having two drive helix regions and two return helix regions; the two return helix regions positioned opposite one another on the ring; an inwardly facing flange on each axial edge of the ring, an inner surface of the ring defining an outer race; and
  a plurality of spherical roller cage assemblies positioned between each flange and abutting the inner surface of the ring, each roller cage assembly housing a spherical roller body in a cage.

Preferably, the return helix regions are offset from the drive helix regions and the offset can be defined as an angle of about 3°.

Preferably, in the return helix region there is a pressure release cutout which allows for the travel of the spherical roller cage assemblies through the return region.

The cage used for the spherical roller cage assemblies has two linear side walls, a linear top wall, a linear bottom wall and four arched corners which connect the side walls to the top and bottom wall. Using arched or curved corners provides for the spherical roller cage assemblies to move through the return helix regions.

Preferably, the inner surface of the cylindrical ring which forms the roller nut body is concave and has a concavity which matches the arched surface of the spherical roller body.

Preferably, a pressure ring is mounted on the outside of the roller nut body.

A linear bearing assembly in accordance with the present Invention comprises a ground shaft and a roller nut assembly as defined herein mounted on the ground shaft.

These and other aspects of the present Invention may be more readily understood by reference to one or more of the following drawings.

DETAILED DESCRIPTION OF THE DRAWINGS

Figure 1:
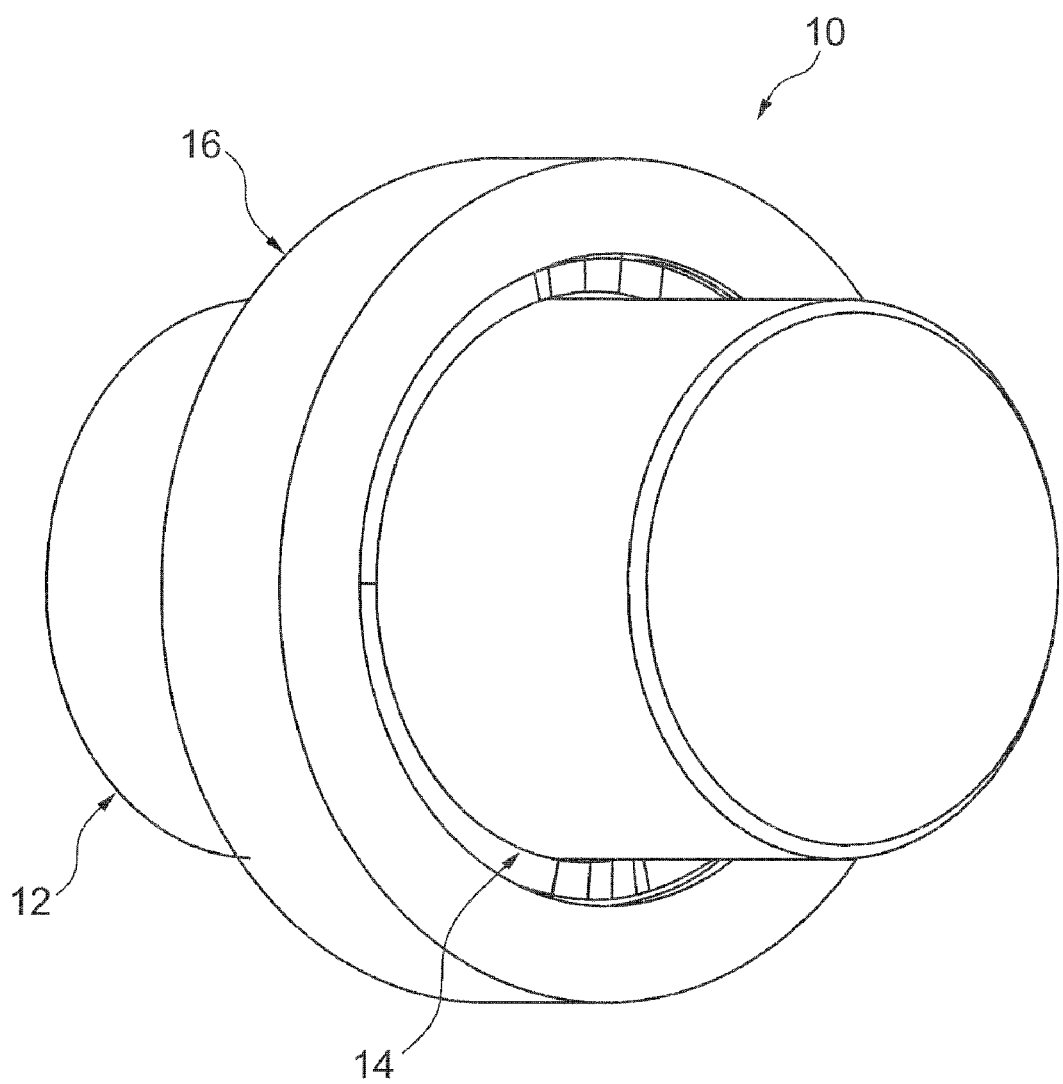
FIG. 1 illustrates the linear bearing assembly of the present Invention.

FIG. 1 illustrates linear bearing assembly 10 having ground shaft 12 with roller nut assembly 14 mounted thereon. Pressure ring 16 encompasses roller nut assembly 14. Pressure ring 16 is optional and is press fitted onto nut assembly 14. As will be understood, roller nut assembly 14 moves axially on ground shaft 12 to provide linear motion to the load carried by roller nut assembly 14.

Figure 2:
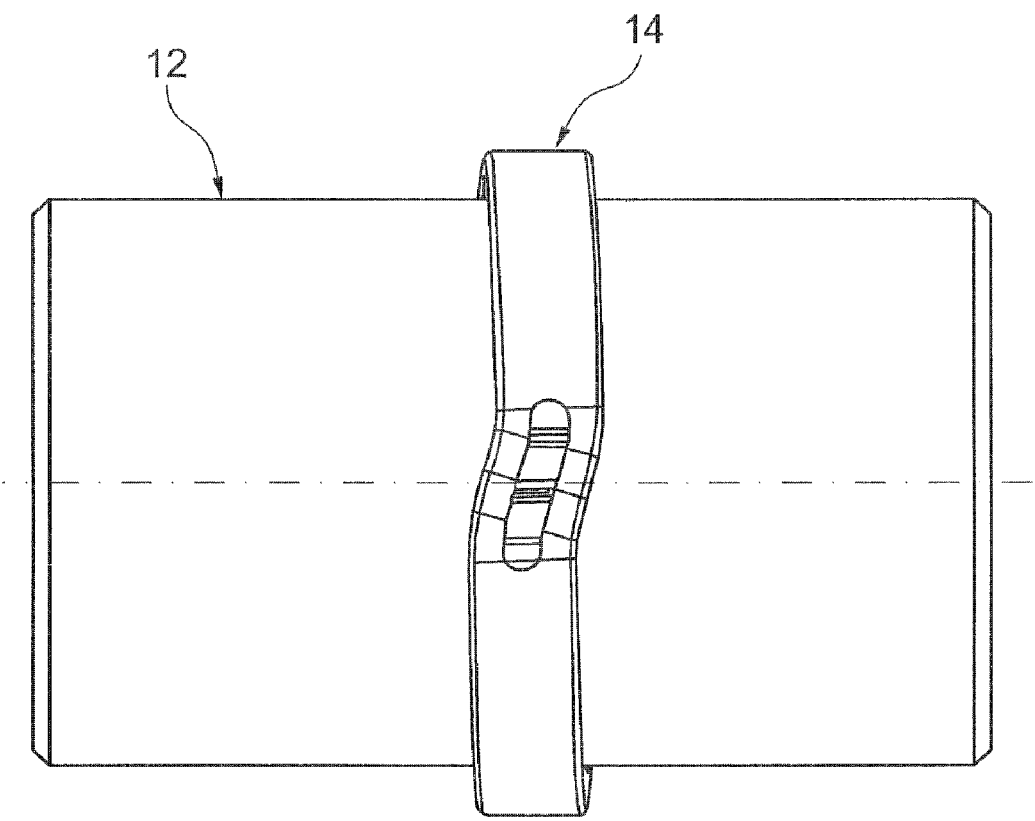
FIG. 2 illustrates the linear bearing assembly without the pressure ring.

FIG. 2 illustrates assembly 10 without pressure ring 16.

Figure 3:
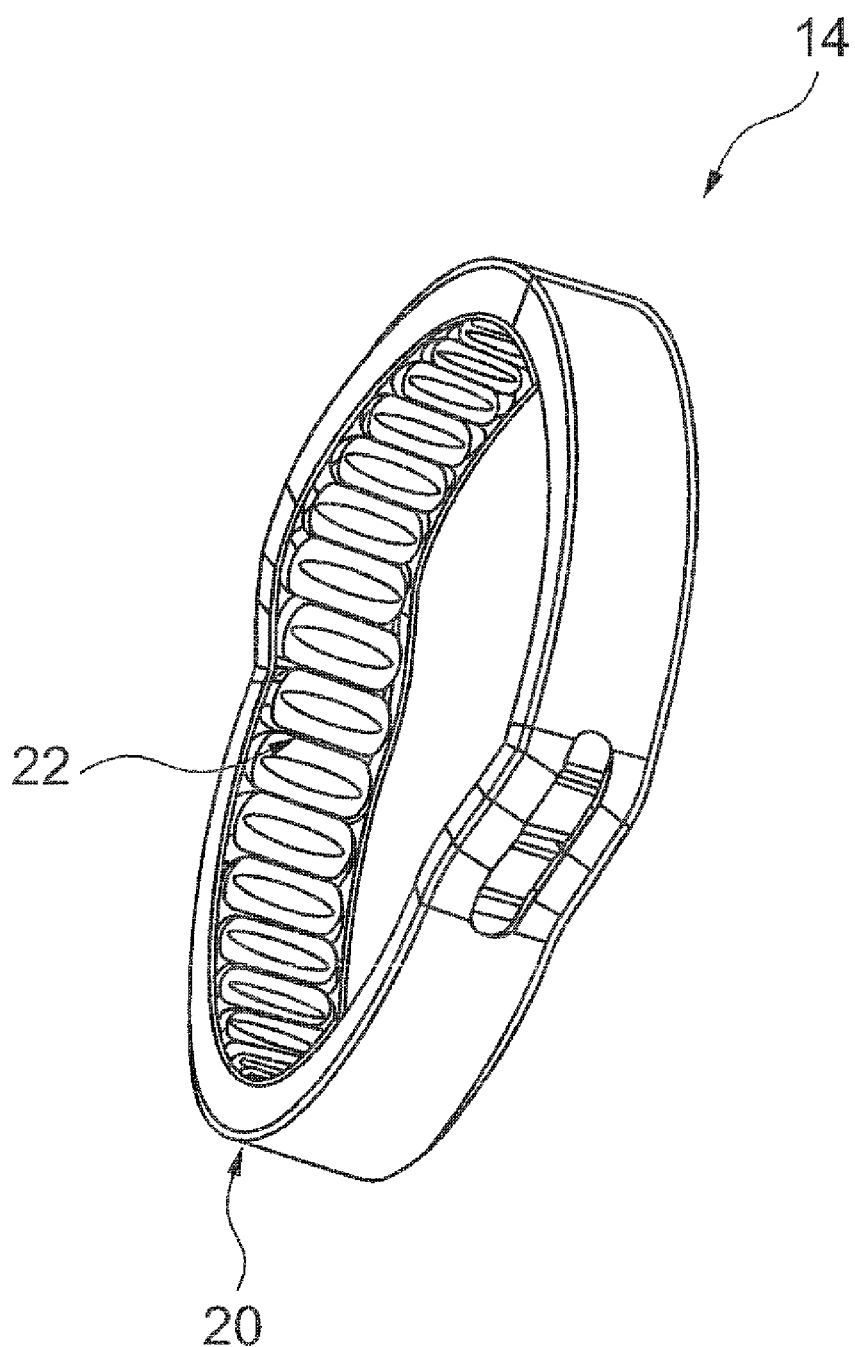
FIG. 3 illustrates the roller nut assembly of the present Invention.

FIG. 3 illustrates roller nut assembly 14 removed from ground shaft 12. Roller nut assembly 14 comprises roller nut body 20 and spherical roller cage assemblies 22.

Figure 4B:
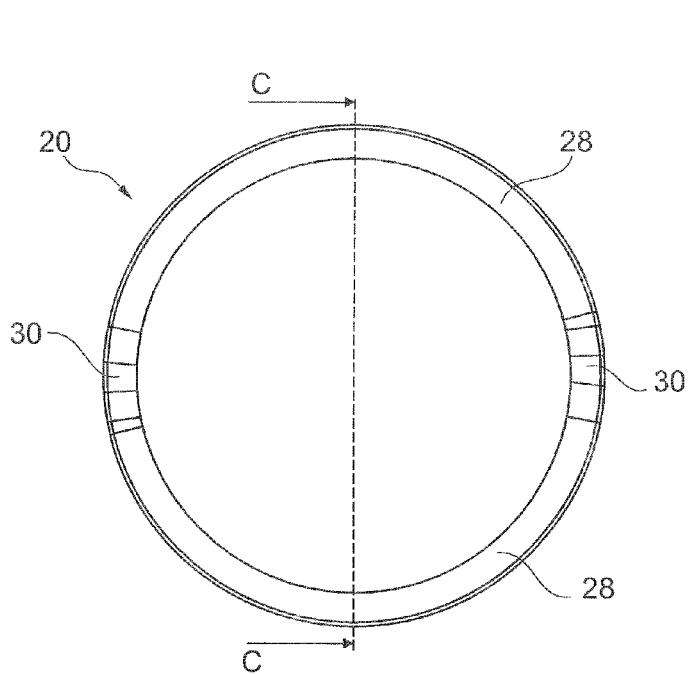
FIGS. 4A-4C illustrates the roller nut body.
Figure 4C:
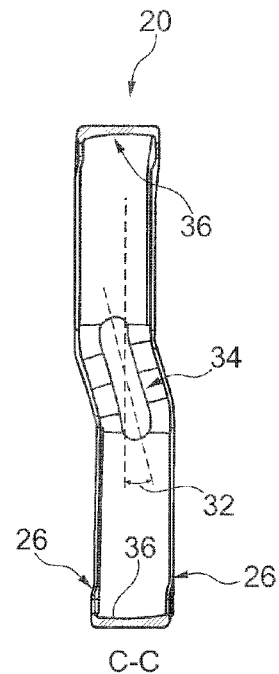
Figure 4A:
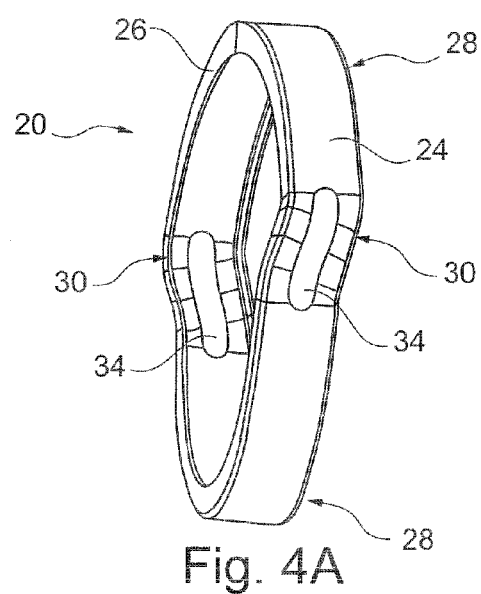

Turning to FIGS. 4A-4C, these Figures illustrate roller nut body 20 in more detail. Roller nut body 20 comprises cylindrical ring 24 which has side flanges 26 which extend inwardly from each axial edge of ring 24. Roller nut body 20 comprises drive helix regions 28 and return helix regions 30. As is illustrated in FIGS. 4A-4C, return helix regions 30 has a length comparable to approximately 4 spherical roller cage assemblies taken in cross section rather than in an axial direction of the spherical roller cage assemblies. Return helix regions can also be defined as being offset from the drive helix regions by an angle 32. Angle 32 is approximately 3°. As shown in FIG. 4C, this illustrates roller nut body 20 taken along lines C-C of FIG. 4B. It can be seen in FIG. 4C that cylindrical ring 24 has a concave inner surface 36 which matches the outer convex surface of the spherical roller body. In order to allow spherical roller cage assemblies to travel through return helix region 30, pressure relief cutout 34 is positioned in each of return helix regions 30.

Figure 5A:
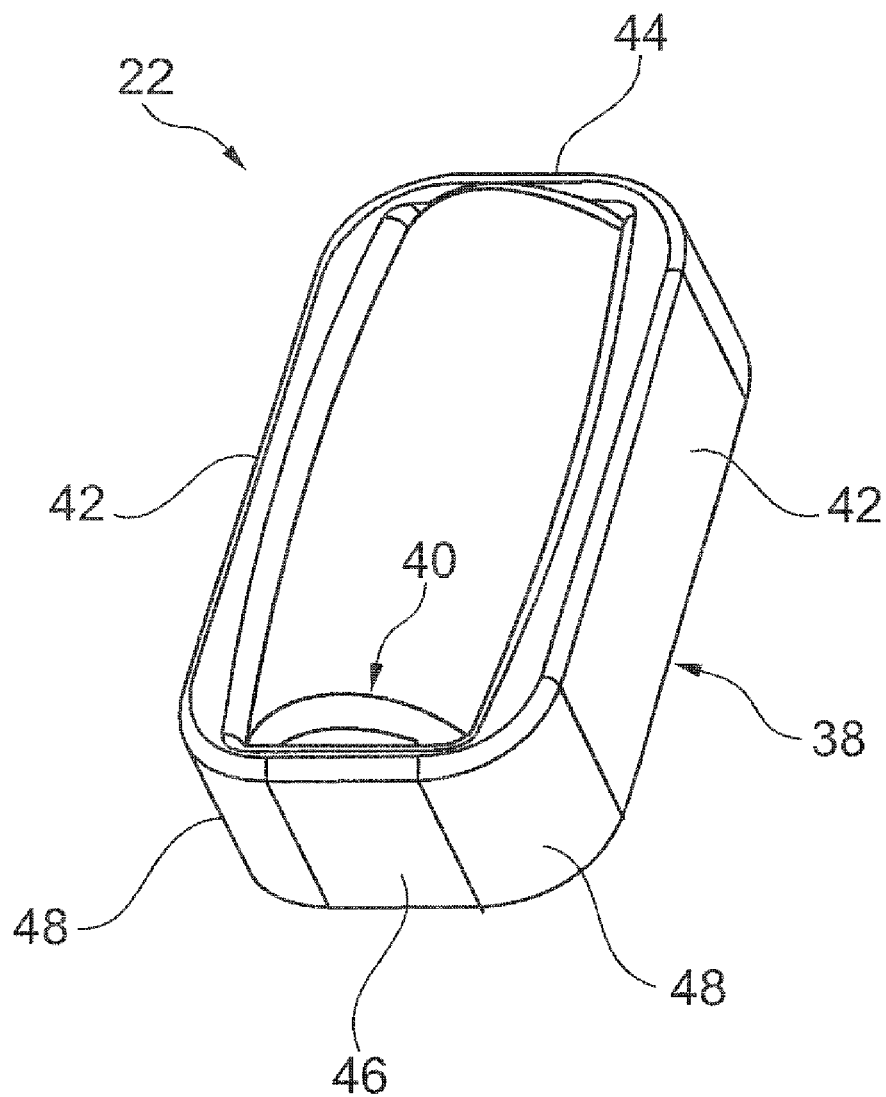
FIGS. 5A-5C illustrates the spherical roller cage assembly.
Figure 5B:
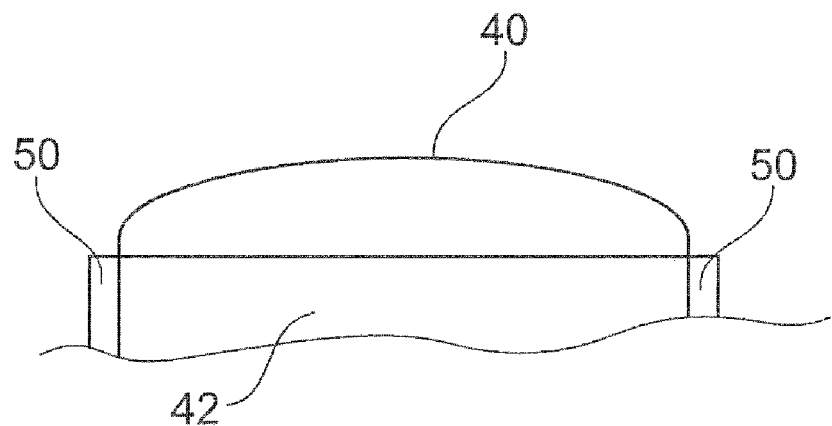
Figure 5C:
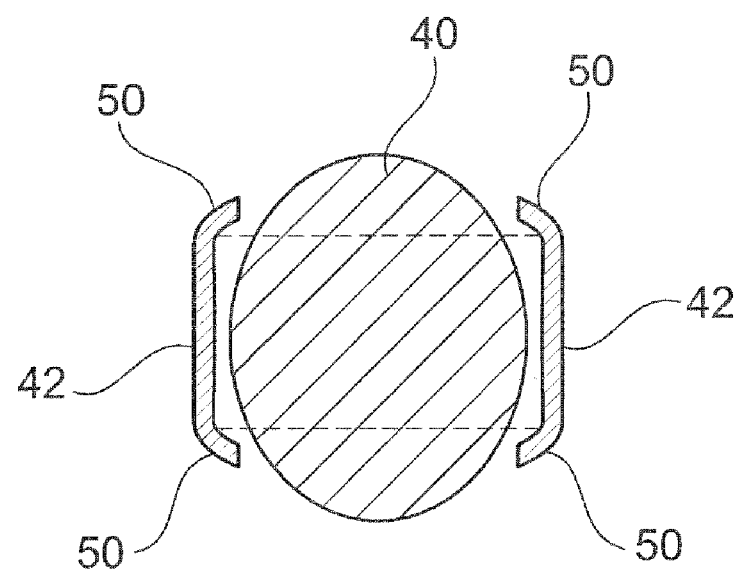

Turning to FIGS. 5A-5C, spherical roller cage assembly 22 is illustrated having cage 38 and spherical roller body 40 therein. Cage 38 has linear side walls 42, top wall 44 and bottom wall 46. The side walls, top wall and bottom wall are joined by arched corners 48. Flange 50 holds spherical roller body 40 in cage 38.

All of the spherical roller cage assemblies are captured radially between the outside of ground shaft 12 and the convex inner surface 36 of roller nut body 20. During operation, concave inner surface 36 also prevents any axial movement between nut body 20 and roller cage assemblies 22 because of applying an even radial force on the outside of roller nut assembly 14. Pressure ring 16 can be used to provide even radial forces. Pressure ring 16 increases the axial thrust load capability of roller nut assembly 14.

Spherical roller cage assemblies 22 are also prevented from moving axially relative to roller nut body 20 because of flanges 26.

On rotating, roller nut assembly 14 about the axis of ground shaft 12, spherical roller bodies 40 in drive helix region 28 travel along the helix 28 by rotating about the axis of the spherical roller body. This action causes a resulting axial motion of nut assembly 14 relative to ground shaft 12. The direction of relative motion depends on clockwise or counter clockwise rotation of nut assembly 14 with respect to ground shaft 12. Alternatively, relative rotational motion between ground shaft 12 and nut assembly 14 may be produced by holding nut assembly 14 stationary and rotating ground shaft 12.

When relative motion occurs between nut assembly 14 and ground shaft 12, roller cage assemblies 22 are forced to traverse a helical path region generated by the shape of roller nut body 20.

When roller cage assemblies 22 reach return helix region 30 of roller nut body 20, the radial pressure on the spherical roller bodies 40 is removed due to the presence of pressure relief cutout 34. The release of pressure enables roller cage assemblies 22 to slide along return helix region 30 and to begin on the next drive helix region 28 in the nut body 20. Roller cage assemblies 22 maintain their orientation of the spherical roller bodies 40 when roller bodies 40 are in return helix region 30 of nut body 20. This insures a smooth transition from return helix region 30 to the next drive region 28.

Slippage between spherical roller cage assemblies 22 and the outer diameter of ground shaft 12 is prevented by friction between spherical rollers 40 and ground shaft 12 at the point of contact. Optionally, pressure ring 16 increases radial force on roller bodies 40 and, thus, increases the frictional force between roller bodies 40 and ground shaft 12.

The curved outside diameter of spherical roller bodies engages the curved inside surface 36 of nut body 20. Rollers 40 are free to roll between the outside surface of around shaft 12 and the curved inner feature of curved inner surface 36 of nut body 20 on their own axis.

High thrust forces can be achieved by using multiple nut body assemblies.

A linear bearing assembly of the present Invention has many industrial applications and can be operated with non-positive linear motion, such as, pick and place machines, photocopy machines, printing machines, precise X-Y stages, linear motion applications in very gritty and dirty environments.

It is intended that the linear bearing assembly of the present Invention can replace screw and ball screws in many applications.

The device of the present Invention is smooth acting and is backlash free.

Reference Characters

10. Linear bearing assembly
12. ground shaft
14. roller nut assembly
16. pressure ring
20. roller nut body
22. spherical roller cage assemblies
24. cylindrical ring
26. flange
28. drive helix region
30. return helix region
32. off set angle
34. pressure relief cutout
36. concave inner surface
38. cage
40. spherical roller body
42. linear side wall
44. top wall
46. bottom wall
48. arched corner
50. flange

I claim :

1. A roller nut assembly for a linear bearing of a ground shaft, comprising:
    a cylindrical ring having two drive helix regions and two return helix regions; the two return helix regions positioned opposite one another on the ring; an inwardly facing flange on each axial edge of the ring, an inner surface of the ring defining an outer race; and
    a plurality of spherical roller cage assemblies positioned between each flange and abutting the inner surface of the ring, each roller cage assembly housing a spherical roller body in a cage.

2. The nut of claim 1, wherein
the return helix regions are offset from the drive helix regions.

3. The nut of claim 2, wherein
the return helix region has a pressure release cutout in the ring.

4. The nut of claim 2, wherein
the offset is defined by an angle of about 3°.

5. The nut of claim 1, wherein
the cage has two linear side walls, a linear top wall and a linear bottom wall, and four arched corners connecting the side walls to the top and bottom wall.

6. The nut of claim 1, wherein
an inner surface of the ring being concave.

7. The nut of claim 1, further comprising
a pressure ring mounted on outside of the ring.

8. A linear bearing assembly comprising:
a ground shaft and a roller nut mounted on the ground shaft, wherein the roller nut has a cylindrical ring having two drive helix regions and two return helix regions; the two return helix regions positioned opposite one another on the ring; an inwardly facing flange on each axial edge of the ring, an inner surface of the ring defining an outer race; and
a plurality of spherical roller cage assemblies positioned between each flange and abutting the inner surface of the ring, each roller cage assembly housing a spherical roller body in a cage.

9. The assembly of claim 8, wherein
the return helix regions are offset from the drive helix regions.

10. The assembly of claim 9, wherein
the return helix region has a pressure release cutout in the ring.

11. The assembly of claim 9, wherein
the offset is defined by an angle of about 3°.

12. The assembly of claim 8, wherein
the cage has two linear side walls, a linear top wall and a linear bottom wall, and four arched corners connecting the side walls to the top and bottom walls.

13. The assembly of claim 8, wherein
an inner surface of the ring being concave.

14. The assembly of claim 8, further comprising:
a pressure ring mounted on outside of the ring.

* * * * *